US012469946B2

(12) United States Patent
Fant

(10) Patent No.: US 12,469,946 B2
(45) Date of Patent: Nov. 11, 2025

(54) DUAL DIRECTIONAL COUPLER WITH MULTIPLE COUPLINGS FOR SYMMETRICAL PERFORMANCE

(71) Applicant: Qorvo US, Inc., Greensboro, NC (US)

(72) Inventor: Tommaso Fant, Munich (DE)

(73) Assignee: Qorvo US, Inc., Greensboro, NC (US)

( * ) Notice: Subject to any disclaimer, the term of this patent is extended or adjusted under 35 U.S.C. 154(b) by 266 days.

(21) Appl. No.: 18/208,057

(22) Filed: Jun. 9, 2023

(65) Prior Publication Data

US 2024/0006737 A1    Jan. 4, 2024

Related U.S. Application Data

(60) Provisional application No. 63/356,688, filed on Jun. 29, 2022.

(51) Int. Cl.
*H01P 5/18* (2006.01)
*H03F 3/24* (2006.01)

(52) U.S. Cl.
CPC ............... *H01P 5/18* (2013.01); *H03F 3/245* (2013.01); *H03F 2200/451* (2013.01)

(58) Field of Classification Search
CPC .. H01P 5/185; H01P 5/18; H01P 5/184; H01P 5/187; H01P 5/04; H01P 5/188; H01P 1/18; H01P 1/213; H03H 7/38; H03H 7/48; H03H 7/004; H03H 7/20; H03H 7/463; H04B 1/04; H04B 1/0458; H04B 1/40; H04B 10/25753; H04B 10/801; H04B 17/101; H04B 17/103; H01L 2223/6616;

(Continued)

(56) References Cited

U.S. PATENT DOCUMENTS 4,420,839 A    12/1983    Hogerheiden, Jr.
6,028,494 A    2/2000    May et al.
(Continued)

OTHER PUBLICATIONS

Feynman, R. et al., "The Feynman Lectures on Physics, vol. II," 1964, Basic Books, 566 pages.
(Continued)

*Primary Examiner* — Lincoln D Donovan
*Assistant Examiner* — Tyler J Pereny
(74) *Attorney, Agent, or Firm* — Withrow & Terranova, P.L.L.C.

(57) ABSTRACT

A dual directional coupler with multiple couplings for symmetrical performance is provided. The dual directional couplers implemented in radio frequency (RF) front-end modules often deliver different RF performance in terms of coupling factor and directivity between the forward and reverse modes. The performance asymmetry between these modes generally has multiple origins, where the two most relevant can be ascribed to the die layout (asymmetric die layout) and module routing (e.g., the antenna and coupler out pads are next to each other and experience mutual coupling). Embodiments described herein aim to improve the performance symmetry of dual directional couplers by employing a novel asymmetric layout which symmetrizes performance by adding mutual couplings that compensate the undesired ones. A novel circuit topology is also presented, which enables the forward and reverse modes to be tuned independently, adding a further degree of freedom during the design phase.

15 Claims, 17 Drawing Sheets

(58) Field of Classification Search
CPC ..... H01L 2223/6627; H01L 2223/6655; H01L 23/645; H01L 23/66; H03F 1/565; H03F 2200/387; H03F 2200/393; H03F 2200/541; H03F 3/193; H03F 3/195
See application file for complete search history.

(56) References Cited

U.S. PATENT DOCUMENTS

| | | | |
|---|---|---|---|
| 6,822,531 | B2 | 11/2004 | Carlson |
| 8,773,216 | B2 | 7/2014 | Dupont et al. |
| 9,503,044 | B2 * | 11/2016 | Granger-Jones ........ H01P 5/185 |
| 10,964,996 | B2 | 3/2021 | Kim et al. |
| 11,837,770 | B2 | 12/2023 | Seki et al. |
| 12,074,358 | B2 * | 8/2024 | Fant ........................ H01P 5/04 |
| 2009/0284326 | A1 | 11/2009 | Napijalo |
| 2015/0236666 | A1 * | 8/2015 | Ootsuka .................. H01P 5/185 333/112 |
| 2016/0065167 | A1 * | 3/2016 | Granger-Jones ....... H03H 7/465 333/112 |
| 2016/0172737 | A1 | 6/2016 | Srirattana et al. |
| 2017/0230066 | A1 | 8/2017 | Little et al. |
| 2018/0351229 | A1 | 12/2018 | Kim et al. |

OTHER PUBLICATIONS

Johnson, H.W. et al., "High-Speed Digital Design: A Handbook of Black Magic," Apr. 1993, Prentice Hall PTR, 446 pages.

Niknejad, A.M. et al., "Chapter 5: Inductance Calculations," in Design, Simulation and Applications of Inductors and Transformers for Si RF Ics, The Springer International Series in Engineering and Computer Science (SECS, vol. 586), Oct. 2000, Springer New York, pp. 59-73.

Niknejad, A.M. et al., "Chapter 6: Calculation of Eddy Current Losses," in Design, Simulation and Applications of Inductors and Transformers for Si RF Ics, The Springer International Series in Engineering and Computer Science (SECS, vol. 586), Oct. 2000, Springer New York, pp. 75-95.

Niknejad, A.M., "Electromagnetics for High-Speed Analog and Digital Communication Circuits," Cambridge University Press, 2007, 464 pages.

Ott, H. W., "Electromagnetic Compatibility Engineering," John Wiley & Sons, Inc., 2009, 869 pages.

Paul, C.R., "Chapter Four: Transmission Lines and Signal Integrity," in Introduction to Electromagnetic Compatibility, Second Edition, John Wiley & Sons, Inc., 2006, first published Sep. 2005, pp. 177-298.

Paul, C.R., "Chapter Nine: Crosstalk," in Introduction to Electromagnetic Compatibility, Second Edition, John Wiley & Sons, Inc., 2006, first published Sep. 2005, pp. 559-712.

Paul, C.R., "Chapter Eleven: System Design for EMC," in Introduction to Electromagnetic Compatibility, Second Edition, John Wiley & Sons, Inc., 2006, first published Sep. 2005, pp. 767-827.

Pozar, D.M., "Microwave Engineering," Fourth Edition, John Wiley & Sons, Inc., 2012, 756 pages.

International Search Report and Written Opinion for International Patent Application No. PCT/US2021/051481, mailed Dec. 14, 2021, 15 pages.

Written Opinion for International Patent Application No. PCT/US2021/051481, mailed May 13, 2022, 9 pages.

International Preliminary Report on Patentability for International Patent Application No. PCT/US2021/051481, mailed Jan. 5, 2023, 18 pages.

Notice of Allowance for U.S. Appl. No. 18/245,153, mailed May 29, 2024, 10 pages.

* cited by examiner

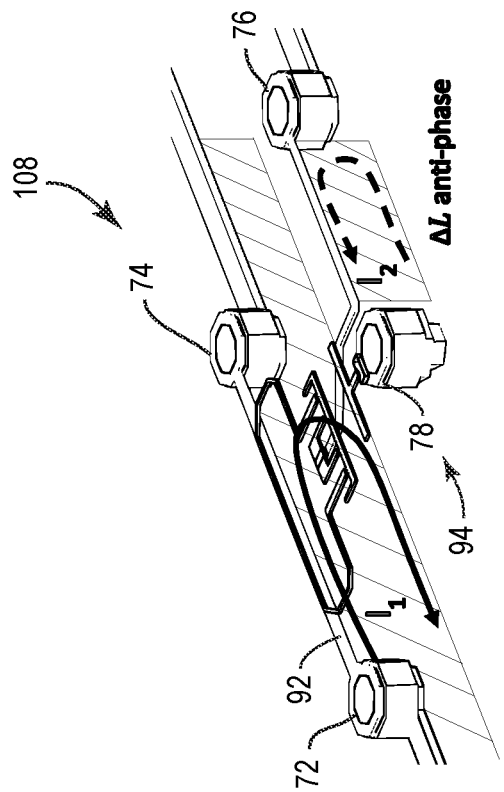
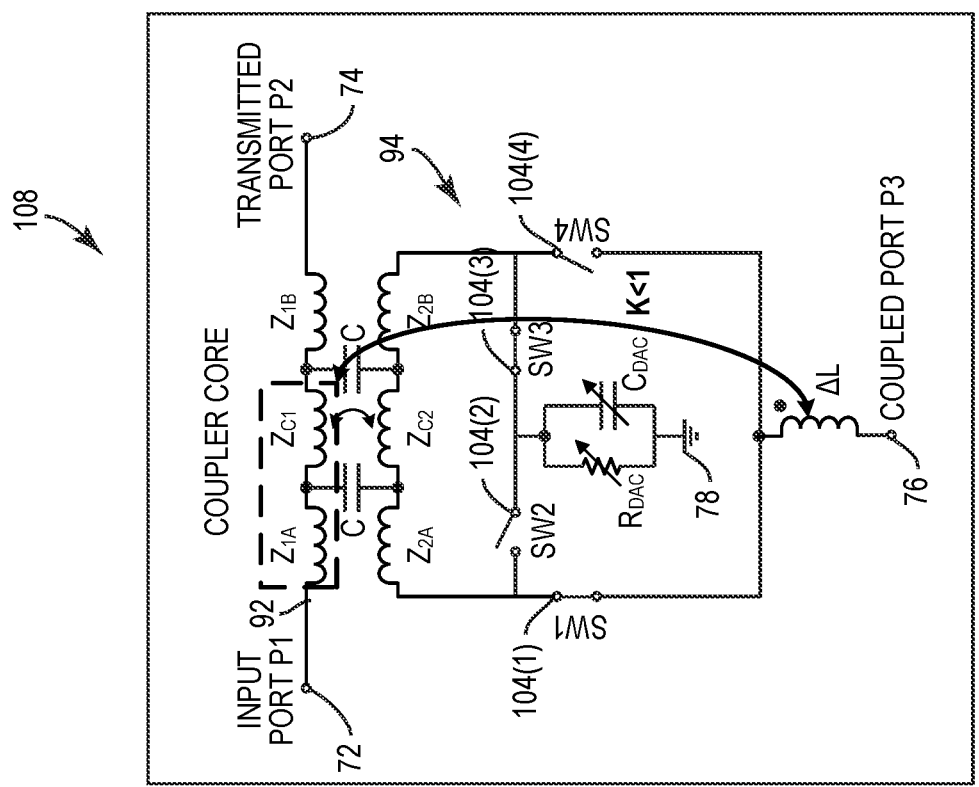
FIG. 10D
FIG. 10C

DUAL DIRECTIONAL COUPLER WITH MULTIPLE COUPLINGS FOR SYMMETRICAL PERFORMANCE

RELATED APPLICATION

This application claims the benefit of provisional patent application Ser. No. 63/356,688, filed Jun. 29, 2022, the disclosure of which is hereby incorporated herein by reference in its entirety.

FIELD OF THE DISCLOSURE

The present disclosure relates generally to a dual directional coupler for use in radio frequency (RF) transceivers.

BACKGROUND

Computing devices have become increasingly common for myriad purposes including providing wireless communication services. The prevalence of these computing devices is driven in part by the many functions that are enabled on such devices. In addition to the many functions, the size and cost of computing devices are at a point where almost anyone can afford at least a rudimentary computing device.

A common element in most mobile computing devices is a radio frequency (RF) front-end module that conditions incoming signals for further processing and outgoing signals for transmission. Such front-end modules may be subject to various protocols and standards with respect to power levels used for transmission. Likewise, incoming signals may have design constraint power restrictions used to avoid damaging delicate circuitry. A common way to measure power levels is through the use of a coupler that allows signals in a communication path to be measured. In front-end modules, a dual directional coupler may be used to measure incoming and outgoing signals using the same basic circuitry.

Where such dual directional couplers are used, there may be mismatches in impedance based on direction, which may negatively impact performance and/or directivity. Accordingly, there remains a need for a better dual directional coupler.

SUMMARY

A dual directional coupler with multiple couplings for symmetrical performance is provided. The dual directional couplers implemented in radio frequency (RF) front-end modules often deliver different RF performance in terms of coupling factor and directivity between the forward and reverse modes. The performance asymmetry between these modes generally has multiple origins, where the two most relevant can be ascribed to the die layout (asymmetric die layout) and module routing (e.g., the antenna and coupler out pads are next to each other and experience mutual coupling). Embodiments described herein aim to improve the performance symmetry of dual directional couplers by employing a novel asymmetric layout which symmetrizes performance by adding mutual couplings that compensate the undesired ones. A novel circuit topology is also presented, which enables the forward and reverse modes to be tuned independently, adding a further degree of freedom during the design phase.

Embodiments described herein have several advantages over traditional approaches, such as a step attenuator in antenna tuners. For example, the compensating couplings restore the coupling factor symmetry and directivity. The tuning load at the isolated ports needs less dynamic and can potentially be tuned with a fixed load for both forward and reverse modes. This leads to a smaller die area and reduced circuit complexity. In addition, in contrast to the frequency dependent step attenuator, this approach is frequency independent, leading to further reductions in die area and circuit complexity.

An exemplary embodiment provides a dual directional coupler having multiple couplings. The dual directional coupler includes a first port, a second port, and a first conductive path coupling the first port to the second port. The dual directional coupler further includes a third port coupled to ground, a fourth port asymmetrically positioned relative to an axis of symmetry, and a second conductive path coupling the third port to the fourth port, the second conductive path electromagnetically coupled to the first conductive path, the second conductive path comprising one or more switches. The fourth port is asymmetrically positioned relative to the axis of symmetry such that a portion of the second conductive path couples to the first conductive path to compensate for asymmetries between a forward mode and a reverse mode of the dual directional coupler.

Another exemplary embodiment provides an RF front end module. The RF front end module includes a filter, a power amplifier coupled to the filter, and a dual directional coupler. The dual directional coupler includes a first port coupled to the filter, a second port, and a first conductive path coupling the first port to the second port. The dual directional coupler further includes a third port coupled to ground, a fourth port, and a second conductive path coupling the third port to the fourth port, the second conductive path electromagnetically coupled to the first conductive path, the second conductive path comprising one or more switches, the second conductive path being asymmetrical across the axis of symmetry to compensate for asymmetries between a forward mode and a reverse mode of the dual directional coupler.

An exemplary embodiment provides a dual directional coupler having multiple couplings. The dual directional coupler includes a first port, a second port, and a first conductive path coupling the first port to the second port. The dual directional coupler further includes a third port coupled to ground, and a fourth port. A second conductive path coupling the third port to the fourth port, the second conductive path electromagnetically coupled to the first conductive path, the second conductive path comprising one or more switches. The third port is asymmetrically positioned relative to an axis of symmetry such that the portion of the second conductive path couples to the first conductive path to compensate for asymmetries between a forward mode and a reverse mode of the dual directional coupler.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 10C is a schematic diagram of a dual directional coupler with increased anti-phase coupled port mutual inductance ΔL according to another exemplary aspect of the present disclosure.

FIG. 10D is an isometric view of a layout of the dual directional coupler of FIG. 10C with current paths shown.

DETAILED DESCRIPTION

Figure 1B:
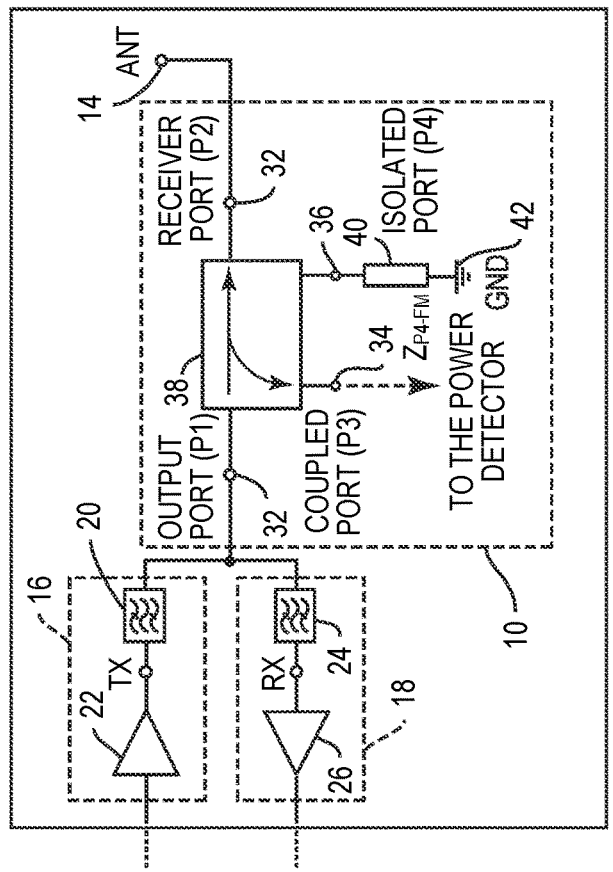
FIG. 1B is a schematic diagram of the dual directional coupler of FIG. 1A operating in a reverse mode.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A dual directional coupler with multiple couplings for symmetrical performance is provided. The dual directional couplers implemented in radio frequency (RF) front-end modules often deliver different RF performance in terms of coupling factor and directivity between the forward and reverse modes. The performance asymmetry between these modes generally has multiple origins, where the two most relevant can be ascribed to the die layout (asymmetric die layout) and module routing (e.g., the antenna and coupler out pads are next to each other and experience mutual coupling). Embodiments described herein aim to improve the performance symmetry of dual directional couplers by employing a novel asymmetric layout which symmetrizes performance by adding mutual couplings that compensate the undesired ones. A novel circuit topology is also presented, which enables the forward and reverse modes to be tuned independently, adding a further degree of freedom during the design phase.

Embodiments described herein have several advantages over traditional approaches, such as a step attenuator in antenna tuners. For example, the compensating couplings restore the coupling factor symmetry and directivity. The tuning load at the isolated ports needs less dynamic and can potentially be tuned with a fixed load for both forward and reverse modes. This leads to a smaller die area and reduced circuit complexity. In addition, in contrast to the frequency dependent step attenuator, this approach is frequency independent, leading to further reductions in die area and circuit complexity.

Before addressing exemplary aspects of the present disclosure, a background on dual directional couplers is provided along with a discussion of the impact directivity and coupling factors have on performance. With this background a discussion of exemplary aspects of the present disclosure begins below with reference to FIG. 4.

Figure 1A:
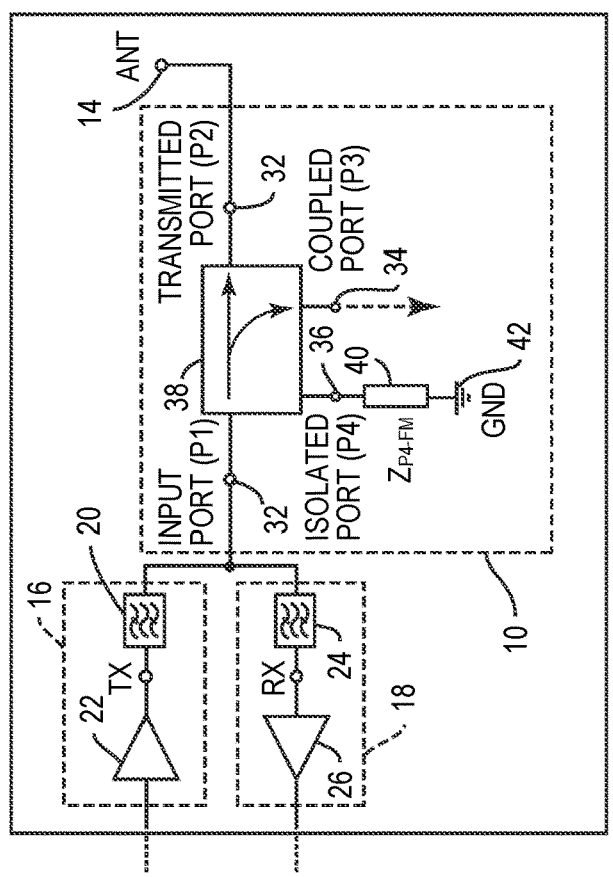
FIG. 1A is a schematic diagram of a dual directional coupler operating in a forward mode.

In this regard, FIGS. 1A and 1B show a dual directional coupler 10 in a forward mode (FIG. 1A) and in a reverse mode (FIG. 1B) while positioned within a radio frequency (RF) front-end module 12. The RF front-end module 12 may include an antenna 14 coupled to the dual directional coupler 10 as well as a transmitter chain 16 and receive chain 18. The transmitter chain 16 may include a first filter 20 and a first power amplifier 22 that are designed to condition a signal for transmission through the antenna 14. Similarly, the receive chain 18 may include a second filter 24 and a second power amplifier 26 (e.g., a low noise amplifier (LNA)) that takes a signal received by the antenna 14, conditions the signal and specifically amplifies the signal for use by other elements within the RF front-end module 12 (e.g., a baseband processor or the like).

The dual directional coupler 10 includes a first port 30 (also referred to as a first input port or P1), a second port 32 (also referred to as a second input port or P2), a third port 34 (also referred to as a coupled port or P3), and a fourth port 36 (also referred to as an isolated port or P4) along with a coupler element 38. The first port 30 may be coupled to the transmit chain 16 and the receive chain 18 and more particularly may be coupled to the filters 20, 24. The second port 32 may be coupled to the antenna 14. The third port 34 may be coupled to a power detector (not shown). The fourth port 36 may be coupled through an impedance element 40 to a ground 42.

When operating in a forward mode, such as shown in FIG. 1A, a signal may originate in a baseband processor (not shown) and be passed to a transceiver within the RF front-end module 12 where the signal is amplified by the power amplifier 22, filtered by the filter 20 and then passes through the dual directional coupler 10. Within the dual directional coupler 10, the signal passes from the first port 30 to the second port 32. The coupler element 38 causes a portion of the signal to be copied and output at the third port 34. The power detector (not shown) may measure the power of the signal to be transmitted and provide feedback to other circuitry so that adjustments to control the power output by the power amplifier 22 and the antenna voltage standing wave radio (VSWR).

Similarly, when operating in a reverse mode, such as shown in FIG. 1B, a signal may impinge on the antenna 14 generating a signal at the second port 32, which is passed to the receive chain 18 through the first port 30 for conditioning and further processing. Some portion of the received signal is copied and output at the third port 34.

The ratio between the power at the second port 32 and the third port 34 is sometimes called the coupling factor and is considered one of the figures of merit for coupler design. Another key figure of merit is directivity, which describes the ability of the coupler to isolate between forward and reverse signals. The higher the directivity, the smaller the error on the antenna VSWR estimate. In general, the load generated by the impedance element 40 is chosen to maximize directivity in both forward and reverse modes. However, the load value for the impedance element 40 may vary between the two modes.

Designing dual directional couplers poses challenges. Specifically, unequal coupling factors between forward mode and reverse mode may lead to an error on estimates of the antenna VSWR, particularly if no compensation for such difference is used. Further, in the impedance element 40 may have a different load in forward mode relative to reverse mode, which may result in challenges during implementation, which may lead to larger die size and additional design effort. It should be appreciated that both coupling factor and directivity may be functions of the load, setting a trade-off between having congruent coupling factors and directivity maximization.

Figure 2B:
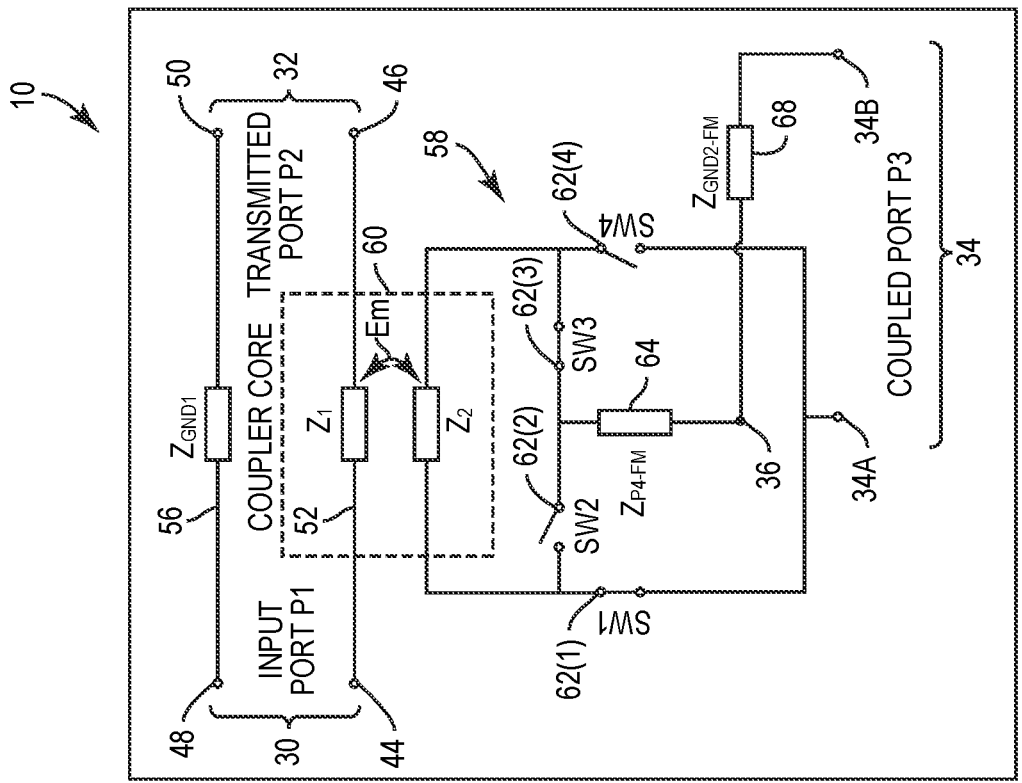
FIG. 2B is a schematic diagram of the dual directional coupler of FIG. 1B with impedances shown.
Figure 2A:
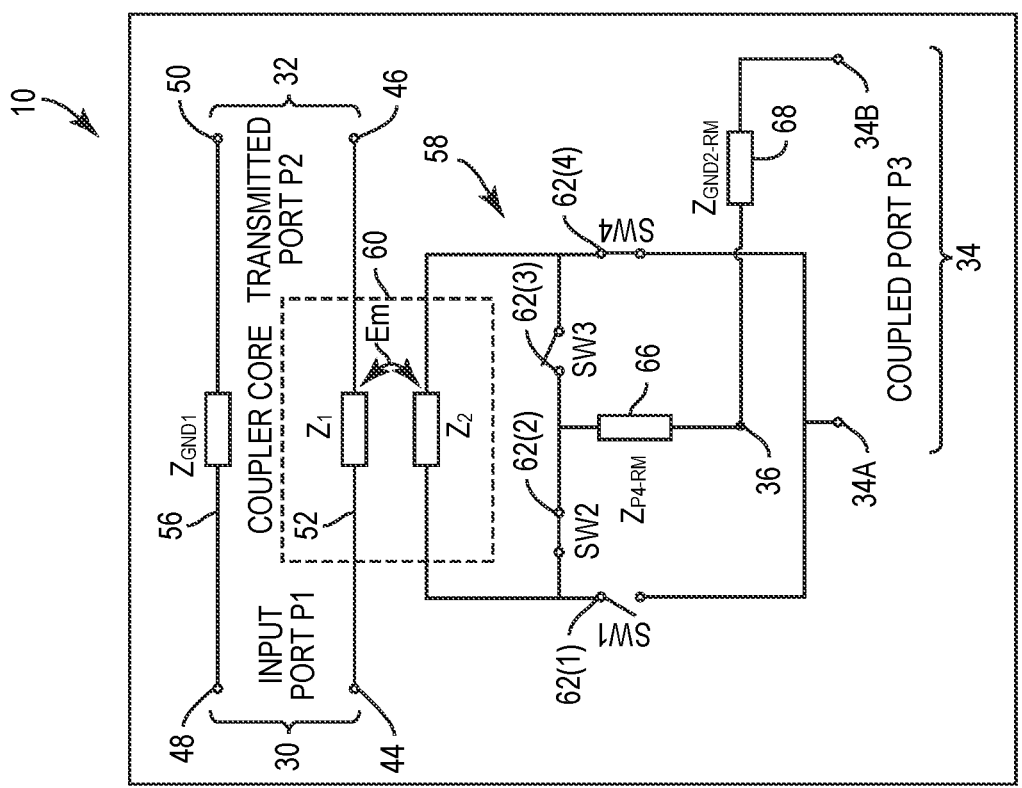
FIG. 2A is a schematic diagram of the dual directional coupler of FIG. 1A with impedances shown.

FIGS. 2A and 2B provide additional details about the dual directional coupler 10. It should be appreciated that the first port 30 and the second port 32 may be two terminal ports, where terminals 44, 46 may be the terminals at which the active signal is input/output and the other terminals 48, 50 may be the ground return path. Accordingly, there is a first conductive path 52 having an impedance 54 (also referred to as $Z_1$) between the terminals 44, 46. Additionally, there is a ground conductive path 56 between the terminals 48, 50 having an impedance $Z_{GND1}$. A second conductive path 58 couples the third port 34 to the fourth port 36. Note that the third port 34 may have two terminals as well 34A, 34B. The first conductive path 52 is electromagnetically coupled (arrow Em) to the second conductive path 58 in a coupler core 60. Note that the coupler core 60 may be a physical element such as a ferromagnetic core, or at the frequencies of interest, may just be an area where the first conductive path 56 is proximate the second conductive path 58 such that a changing electric current along the first conductive path 56 creates a changing electric field that induces an electric current along the second conductive path 58 as is well understood.

The second conductive path 58 includes switches 62(1)-62(4) that allow switching between forward mode and reverse mode in the coupler 10. Specifically, in the forward mode illustrated in FIG. 2A, the switches 62(2) and 62(4) are open, and the switches 62(1) and 62(3) are closed whereas, in the reverse mode the switches 62(2) and 62(4) are closed and the switches 62(1) and 62(3) are open. Switching in this manner allows the impedance element 40 to change from a forward mode impedance 64 ($Z_{P4-FM}$) to a reverse mode impedance 66 ($Z_{P4-RM}$). Further, due to the current steering of the switches 62(1)-62(4), a ground impedance 68 may change from a forward mode ($Z_{GND2-FM}$) to a reverse mode ($Z_{GND2-RM}$).

To achieve symmetrical performance between forward and reverse modes, the two second conductive paths 58 shown in FIGS. 2A and 2B must also be electrically identical. However, if the current in one mode follows a different return path compared to the other, it is likely that $Z_{GNDi-FM}$ will not equal $Z_{GNDi-RM}$. A closer examination of the ground return path may assist in understanding. Accordingly, a more detailed examination of the coupler core 60 is provided with reference to FIGS. 3A and 3B.

Figure 3B:
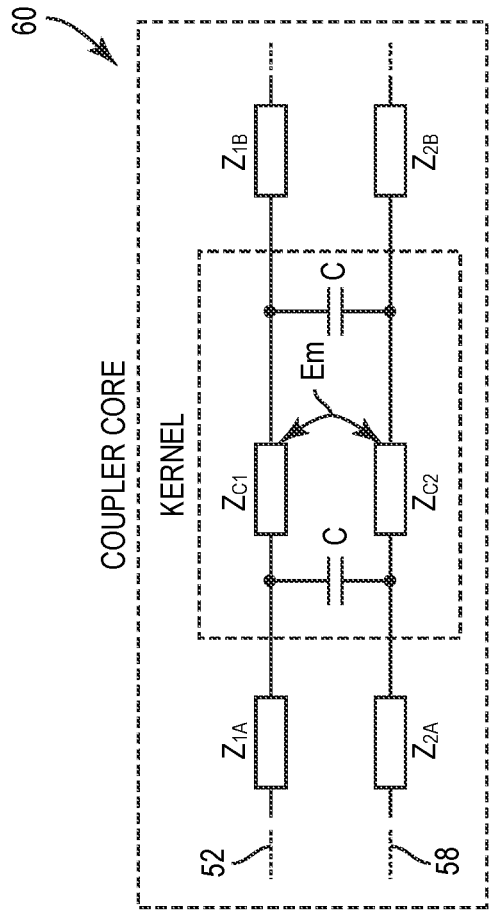
FIG. 3B is a more detailed schematic diagram of the coupler core of FIG. 3A with the kernel of the core, and the kernel's impedances shown.
Figure 3A:
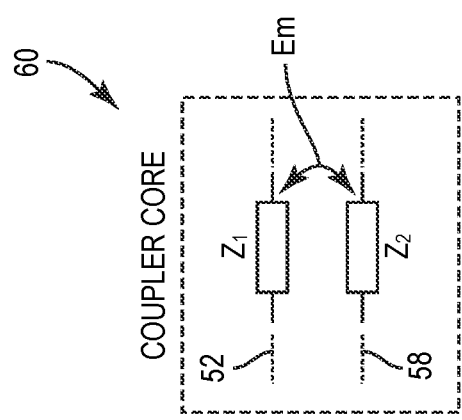
FIG. 3A is a schematic diagram of a coupler core.

FIG. 3A illustrates the coupler core 60 and the impedances $Z_1$ and $Z_2$ of the two conductive paths 52 and 58. FIG. 3B provides an equivalent circuit for the coupler core 60 where $Z_1$ is actually three impedance elements $Z_{1A}$, $Z_{c1}$, and $Z_{1B}$ and $Z_2$ is likewise three impedance elements $Z_{2A}$, $Z_{c2}$, and $Z_{2B}$. Additional capacitors C may exist between the conductive paths 52, 58. $Z_{c1}$ and $Z_{c2}$ are coupled with each other and together with capacitors C represent the kernel of the coupler core 60. $Z_{1A}$, $Z_{1B}$, $Z_{2A}$, and $Z_{2B}$ can be perceived as parasitic, modeling the metal lines interconnecting the kernel to the remaining circuitry and ports.

I. Symmetrical Coupler Layout

To achieve congruent performance, exemplary aspects of the present disclosure assist in making sure that $Z_{1A}$ equals $Z_{1B}$ and $Z_{2A}$ equals $Z_{2B}$. This is done by minimizing or removing asymmetries in terms of coupling factor and directivity. That is, once the first port and the second port are located on a substrate as part of the design, an axis of symmetry is drawn and serves as a reference for symmetrical layout of the RF circuit. In an exemplary aspect, to facilitate a symmetrical return path for the current between forward and reverse modes, the third port and the fourth port fall or are positioned on the axis of symmetry.

Figure 4:
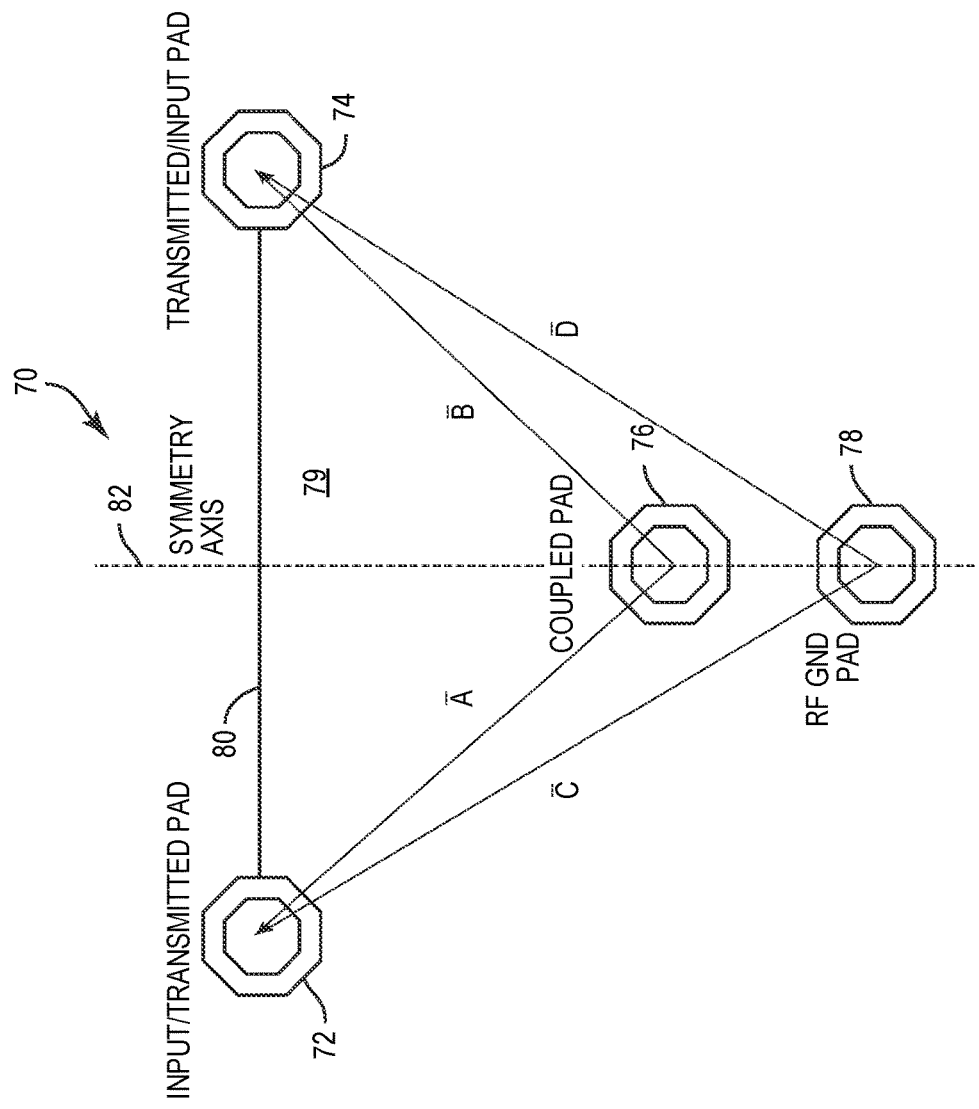
FIG. 4 illustrates a top plan view of ports for a symmetrical dual directional coupler.

Conceptually, this positioning is illustrated in FIG. 4, where a dual directional coupler 70 includes a first port 72, a second port 74, a third port 76, and a fourth port 78 positioned on a substrate 79. The ports 72, 74, 76, and 78 may sometimes be referred to as a pad and may be two terminals as previously described. The first port 72 and the second port 74 are input/output ports analogous to ports 30, 32 of the dual directional coupler 10. The third port 76 is a coupled port configured to be coupled to a power detector or the like and is analogous to the port 34 of the dual directional coupler 10. The fourth port 78 may be a ground or terminated port analogous to the port 36 of the dual directional coupler 10. The first port 72 and the second port 74 define a line 80 therebetween. An axis of symmetry 82 bisects the line 80. The third port 76 and the fourth port 78 are positioned on the axis of symmetry 82. As illustrated, the third port 76 is closer to the line 80 than the fourth port 78. Note that the positions of the third port 76 and the fourth port 78 may be switched such that the fourth port 78 is closer to the line 80 than the third port 76. Line $\overline{A}$ extends from the first port 72 to the third port 76. Line $\overline{B}$ extends from the second port 74 to the third port 76. Line $\overline{C}$ extends from the first port 72 to the fourth port 78. Line $\overline{D}$ extends from the second port 74 to the fourth port 78. By using the axis of symmetry 82, it possible to guarantee that line $\overline{A}$ has a magnitude or length equal to line $\overline{B}$. Likewise, line $\overline{C}$ has a magnitude or length equal to line $\overline{D}$. Now to make congruent performance, the layout of the RF circuit is also symmetrical across the axis of symmetry 82.

By making the layout of the RF circuit symmetrical across the axis of symmetry 82, $Z_{1A}$ equals $Z_{1B}$ and $Z_{2A}$ equals $Z_{2B}$. Further, unlike past coupler designs where substrate thickness may exacerbate asymmetries, the thickness of substrate 79 does not materially affect performance. To the extent that any asymmetries exist as a function of real-world manufacturing tolerances, such asymmetries should have minimal impact on performance as these asymmetries primarily affect directivity, for which there is compensation in the form of dedicated impedance loads. Such minor asymmetries have negligible impact on the coupling factor.

Figure 5:
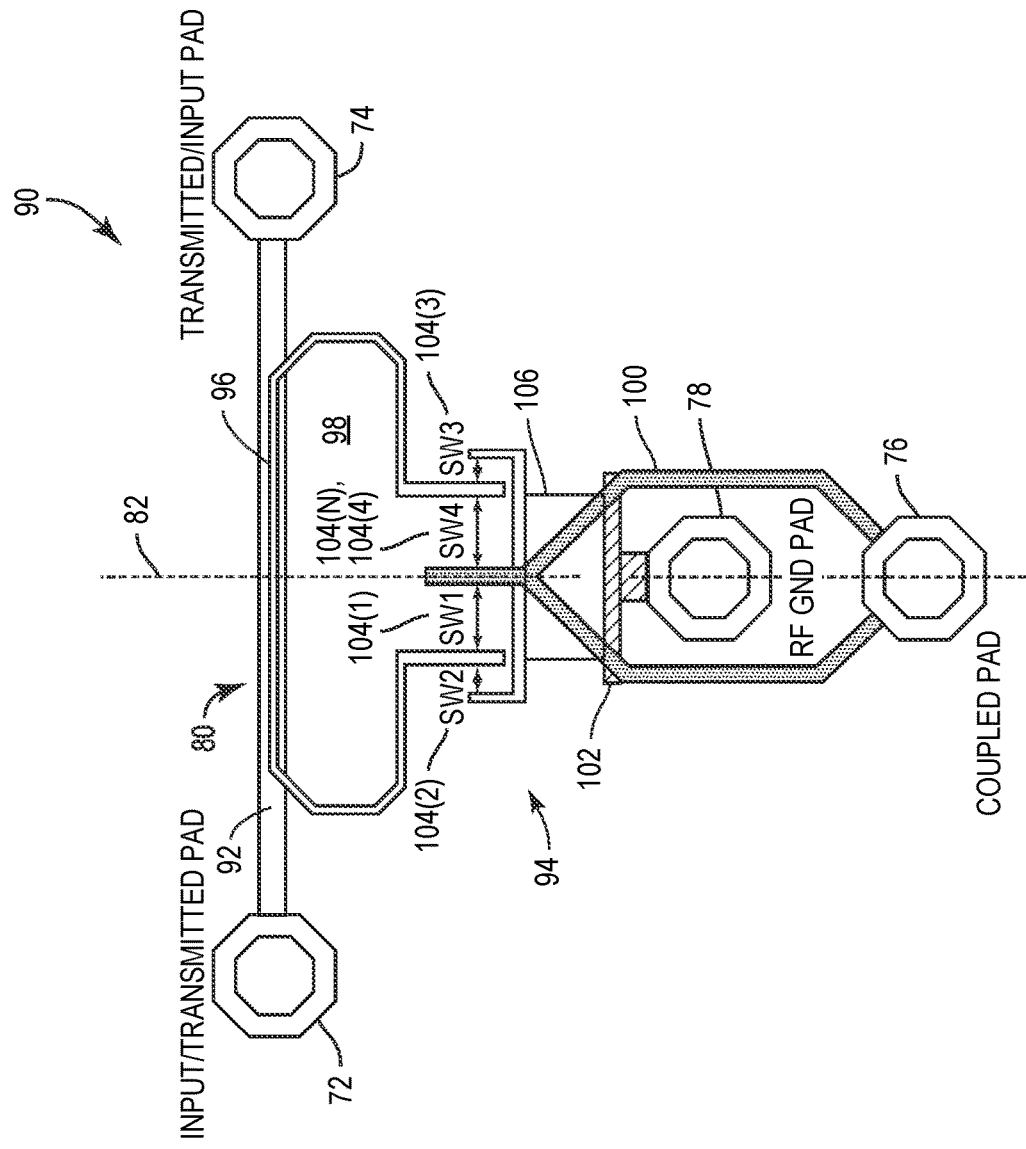
FIG. 5 is a top plan view of the symmetrical dual directional coupler of FIG. 4 with symmetrical switches and conductive paths shown.

FIG. 5 illustrates an example layout which satisfies the requirements explained in relation to FIG. 4. Note that this is not the only possible circuit layout and other layouts may be used without departing from the present disclosure. For example, while not illustrated, the third port 76 and the fourth port 78 may be on opposite sides of line 80.

With reference to FIG. 5, a dual directional coupler 90 includes the first port 72 and the second port 74 coupled to one another by a first conductive path 92 extending therebetween. In an exemplary aspect, the first conductive path 92 follows the line 80 (i.e., extends directly between the first port 72 and the second port 74) and is symmetrical between the first port 72 and the second port 74 across the axis of symmetry 82. That is, the axis of symmetry 82 bisects the first conductive path 92. The dual directional coupler 90 also includes the third port 76 and the fourth port 78. The fourth port 78 is symmetrically positioned relative to the third port 76 across the axis of symmetry 82. A second conductive path 94 couples the third port 76 to the fourth port 78. The second conductive path 94 is electromagnetically coupled to the first conductive path 92. As illustrated, the second conductive path 94 includes a first portion 96 that is positioned parallel to the first conductive path 92 and is further positioned in a second plane above a plane containing the first conductive path 92. That is, the first conductive plane 92 lies in a first plane and the second conductive path 94 lies in a second plane different than and above the first plane. A dielectric material (e.g., part of a substrate 98) may be positioned between the first conductive path 92 and the second conductive path 94.

The second conductive path 94 is symmetrical across the axis of symmetry 82 and may have, as noted, a first portion 96 that couples to a second portion 100 and a third portion 102 through one or more switches 104(1)-104(N), where in the illustrated embodiment N is four (4). The second portion 100 is coupled directly to the third port 76. The third portion is coupled directly to the fourth port 78. The switches 104(1)-104(4) selectively couple the first portion 96 to the second portion 100 or the third portion 102. Specifically, a first switch 104(1) selectively couples the first portion 96 to the second portion 100. A second switch 104(2) selectively couples the first portion to the third portion 102. A third switch 104(3) selectively couples the first portion 96 to the third portion 102. A fourth switch 104(4) selectively couples the first portion 96 to the second portion 100. The third portion 102 includes an impedance element 106 ($Z_{P4}$)

between the switches 104(1), 104(4) and the fourth port 78. As illustrated, the second portion 100 is a generally hexagonal shape although other shapes are possible.

II. Compensating Couplings

As described above, the primary coupling mechanism occurs within the coupler core (see FIGS. 3A and 3B); however, additional undesired coupling mechanisms (of smaller magnitude) may still occur at laminate and/or evaluation board (EVB) level. These couplings of lower intensity detune the RF performance, affecting directivity and/or causing asymmetric coupling factor between the forward and reverse mode. This performance detuning can be mitigated by adding mutual couplings by proper die design which cancel the undesired couplings occurring at laminate/EVB level.

Figure 6:
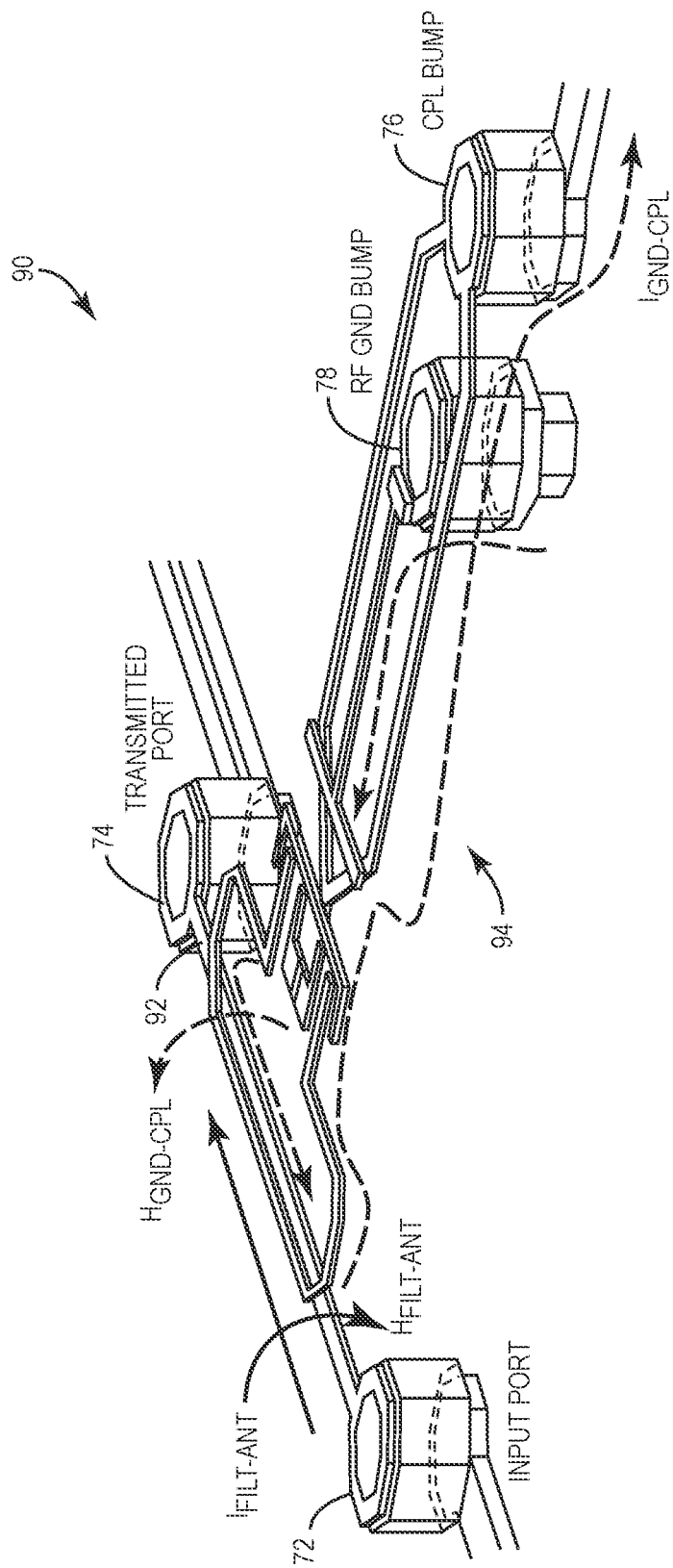
FIG. 6 is an isometric view of the symmetrical dual directional coupler of FIG. 5 with current and magnetic field paths shown.

FIG. 6 is an isometric view of the symmetrical dual directional coupler 90 of FIG. 5 with current and magnetic field paths shown. The main coupling mechanism occurs between the first conductive path 92 and the second conductive path 94. In the forward mode, current ($I_{FILT-ANT}$) flows in the first conductive path 92 from the first port 72 (e.g., a filter port or pad) to the second port 74 (e.g., an antenna port or pad). The direction of the magnetic field ($H_{FILT-ANT}$) is given by the right-hand rule. In the second conductive path 94, the current flows out of the third port 76 (e.g., a coupled port or bump) and into the fourth port 78 (e.g., a ground port or pad). An additional coupling in phase with the main coupling would increase the coupling factor. If in anti-phase, the coupling factor would reduce.

A. Asymmetries at the Laminate/EVB Level

Figure 7:
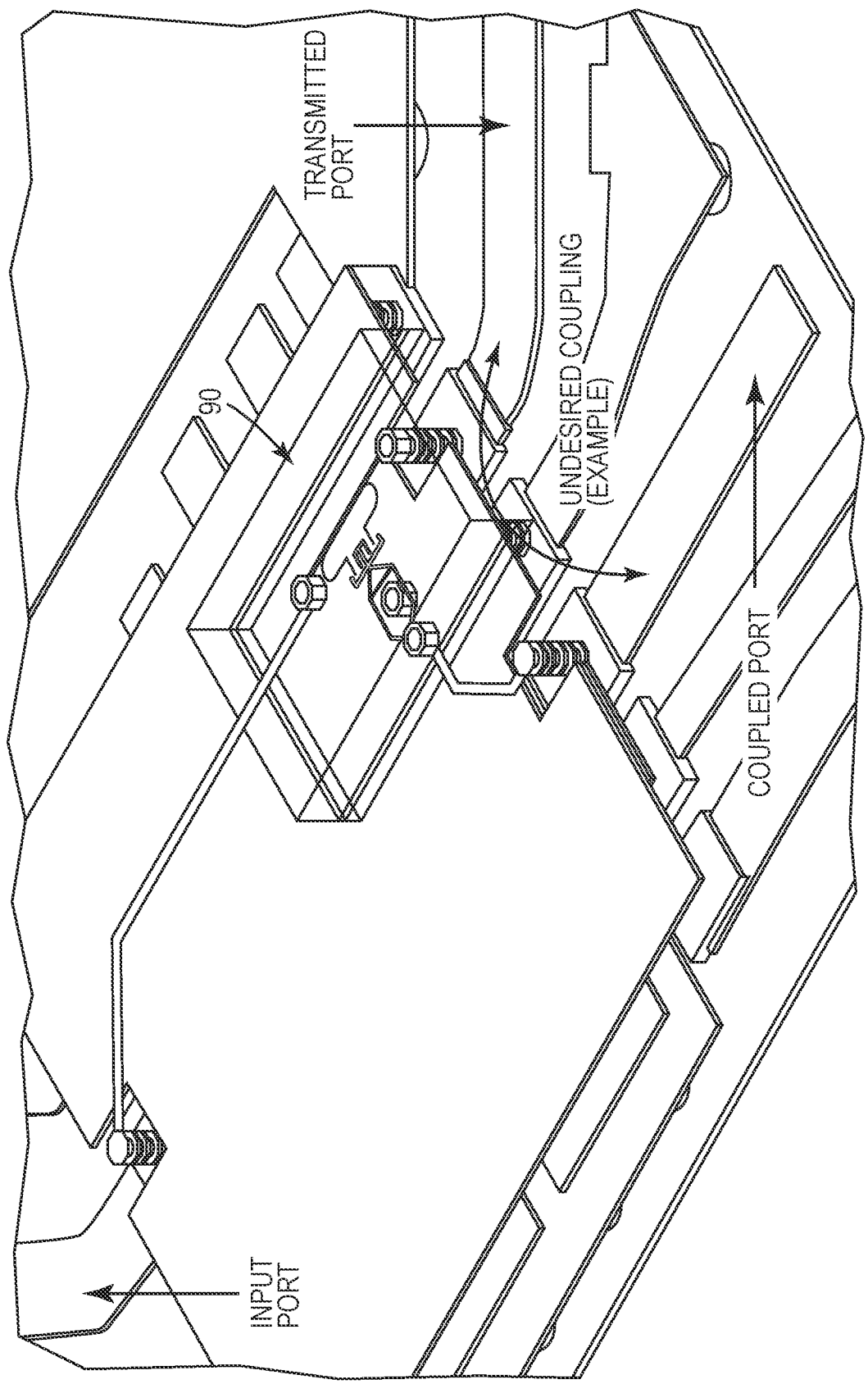
FIG. 7 is an isometric view of the symmetrical dual directional coupler of FIG. 5 on an asymmetric module routing.

FIG. 7 is an isometric view of the symmetrical dual directional coupler 90 of FIG. 5 on an asymmetric module routing. Despite the die layout of the symmetrical dual directional coupler 90 being symmetric, the RF performance is asymmetric due to mutual couplings occurring at the laminate/EVB level. In this case, the coupling and antenna ports are near each other and they are subject to a higher mutual coupling compared to the coupling and input ports.

B. Effect of Additional Couplings

This section outlines how additional couplings (of low entity) can be added by design, to improve the performance symmetry.

1. Increasing the Ground Self-Inductance

Figure 8B:
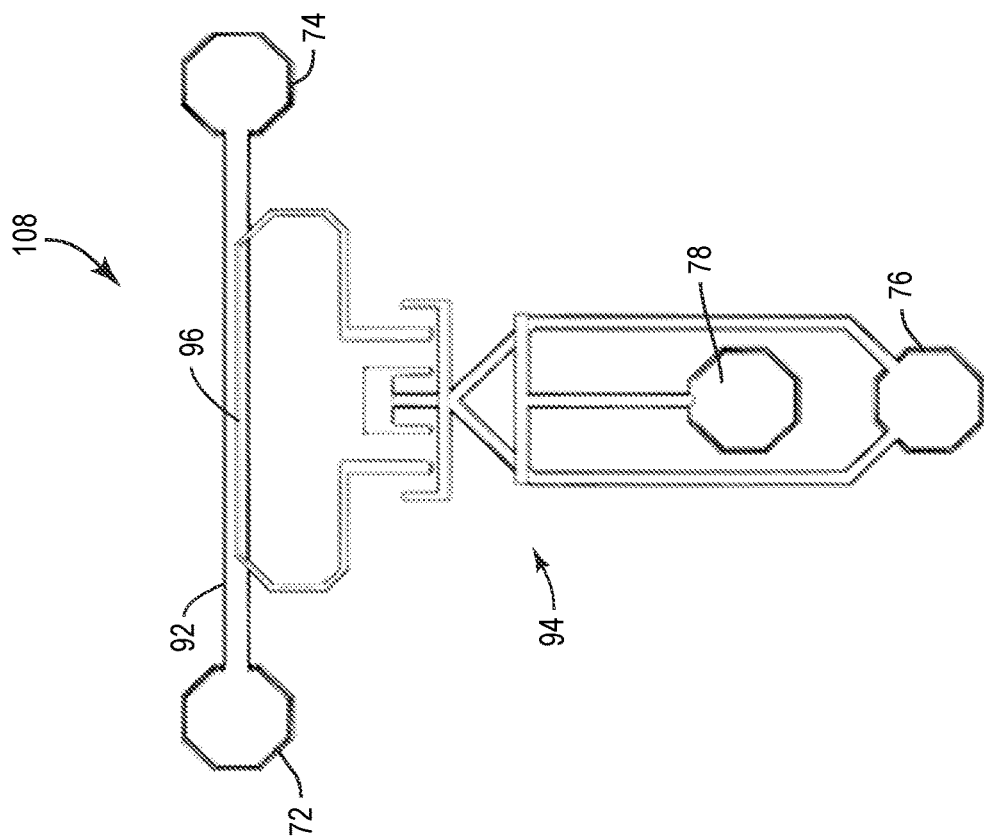
FIG. 8B illustrates the layout of a dual directional coupler with self-inductance ΔL according to an exemplary aspect of the present disclosure.
Figure 8A:
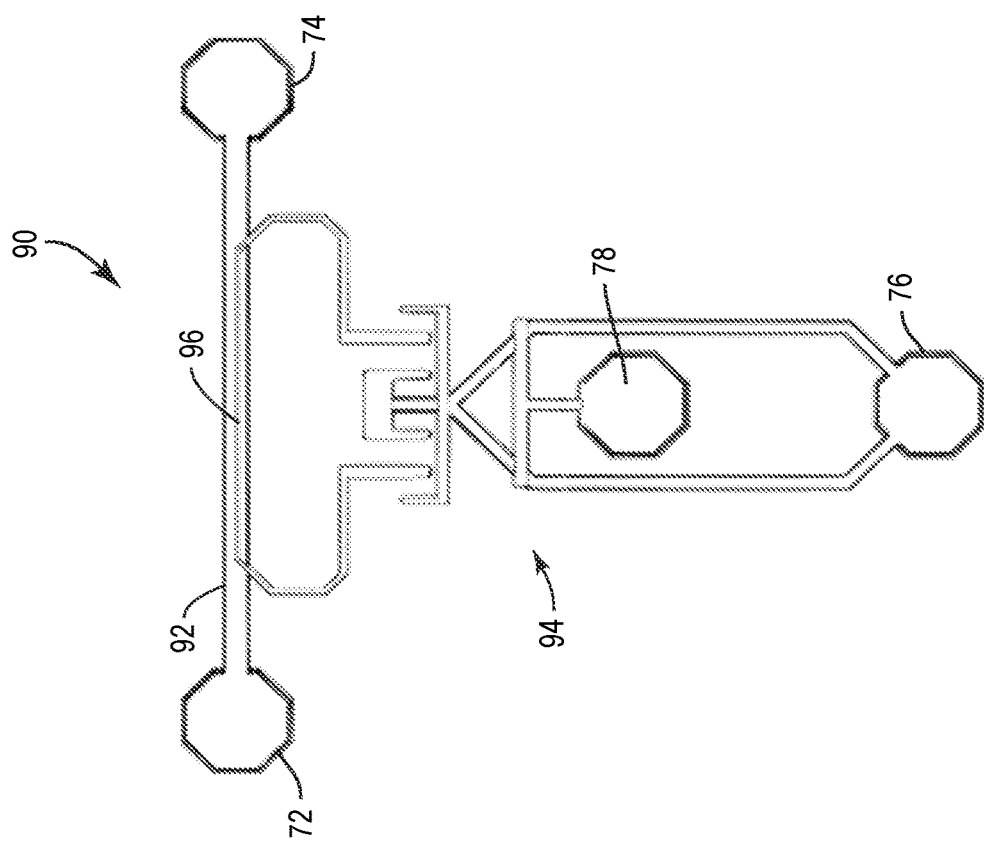
FIG. 8A is a top view of the layout of the symmetrical dual directional coupler of FIG. 5 with the switches omitted.

FIG. 8A is a top view of the layout of the symmetrical dual directional coupler 90 of FIG. 5 with the switches omitted. FIG. 8B illustrates the layout of a dual directional coupler 108 with ground self-inductance $\Delta L$ according to an exemplary aspect of the present disclosure. In the layout of FIG. 8B, the metal trace to the fourth port 78 (e.g., RF ground bump) has been extended to increase the self-inductance.

Figure 8D:
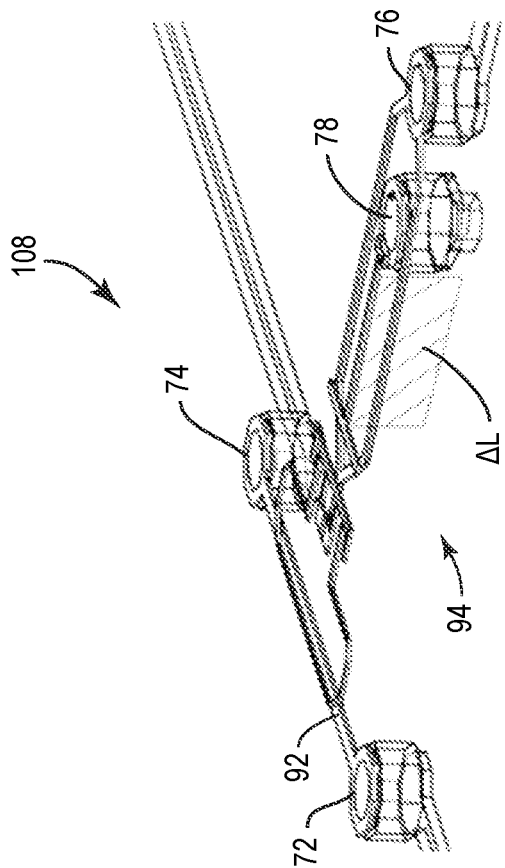
FIG. 8D shows an isometric view of the dual directional coupler of FIG. 8B.
Figure 8C:
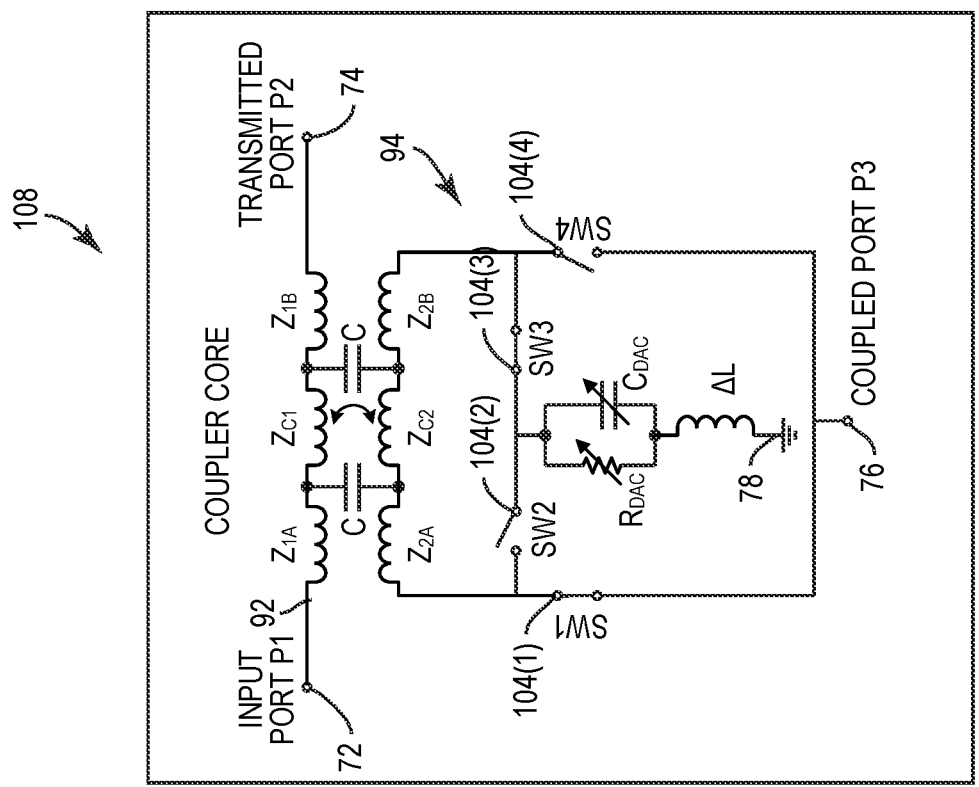
FIG. 8C shows an equivalent lumped circuit of the dual directional coupler of FIG. 8B.

FIG. 8C shows an equivalent lumped circuit of the dual directional coupler 108 of FIG. 8B. FIG. 8D shows an isometric view of the dual directional coupler 108 of FIG. 8B. The inductance $\Delta L$ gained by the layout change from FIG. 8A to 8B is shown. FIG. 8D illustrates how the $\Delta L$ value is given by the area, hence also the choice of the ground plane plays a role.

Figure 9B:
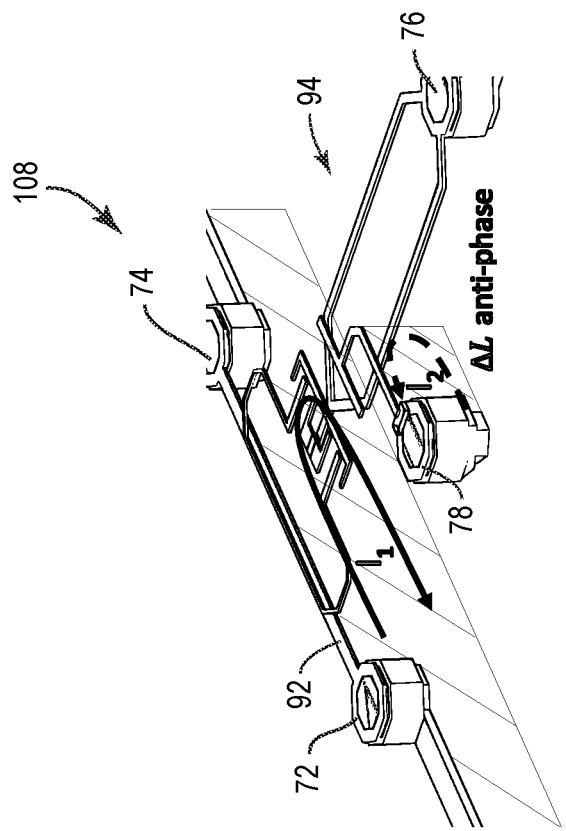
FIG. 9B is an isometric view of a layout of the dual directional coupler of FIG. 9A with current paths shown.
Figure 9A:
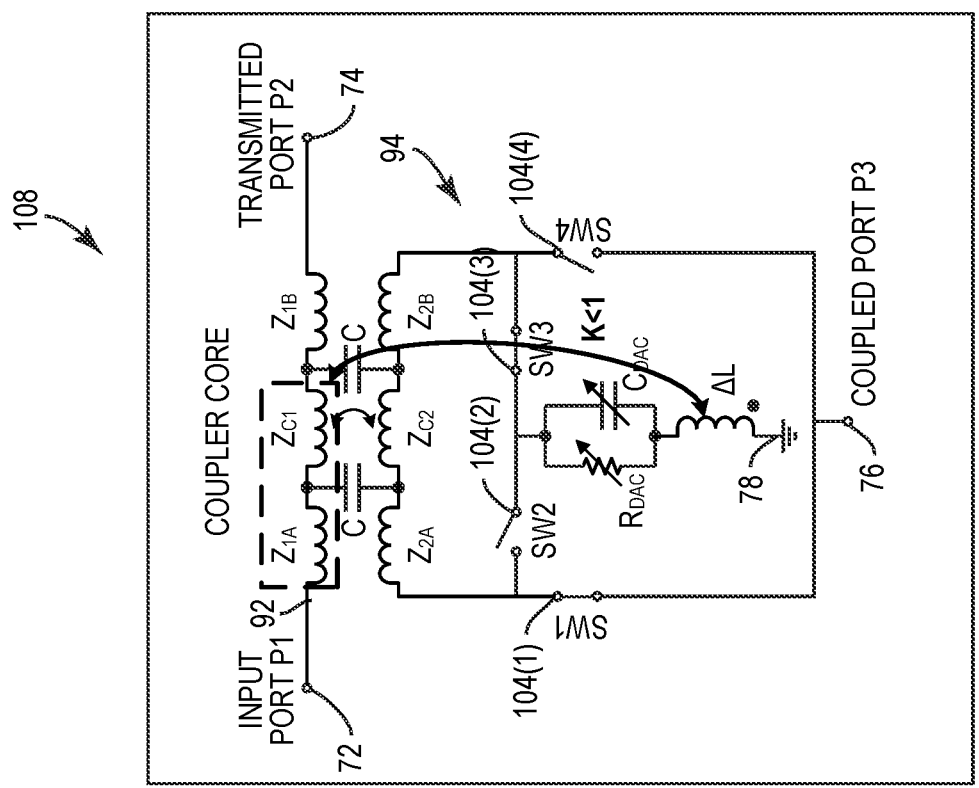
FIG. 9A is a schematic diagram of a dual directional coupler with increased anti-phase ground mutual inductance ΔL according to another exemplary aspect of the present disclosure.

2. Increasing the Magnetic Coupling Between $\Delta L$ and the First Conductive Path FIG. 9A is a schematic diagram of a dual directional coupler 108 with increased anti-phase ground mutual inductance $\Delta L$ according to another exemplary aspect of the present disclosure. FIG. 9B is an isometric view of a layout of the dual directional coupler 108 of FIG. 9A with current paths shown.

Figure 9D:
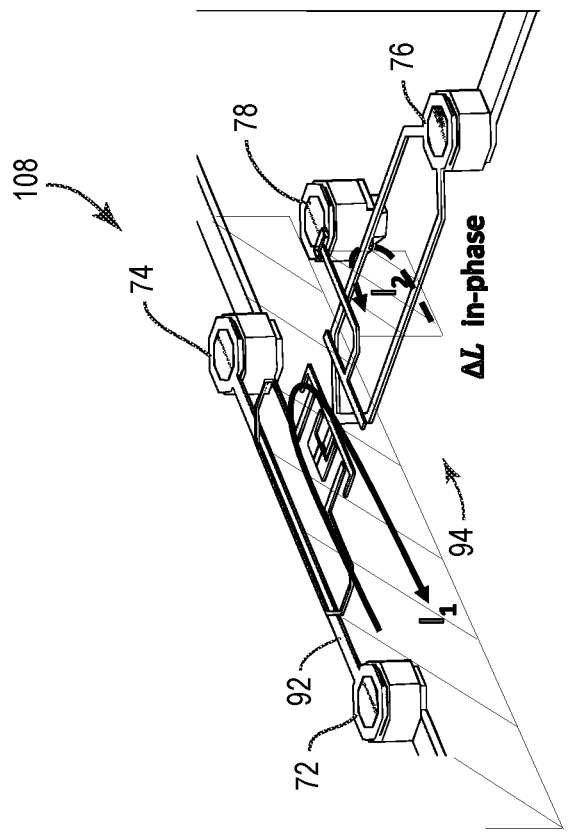
FIG. 9D is an isometric view of a layout of the dual directional coupler of FIG. 9C with current paths shown.
Figure 9C:
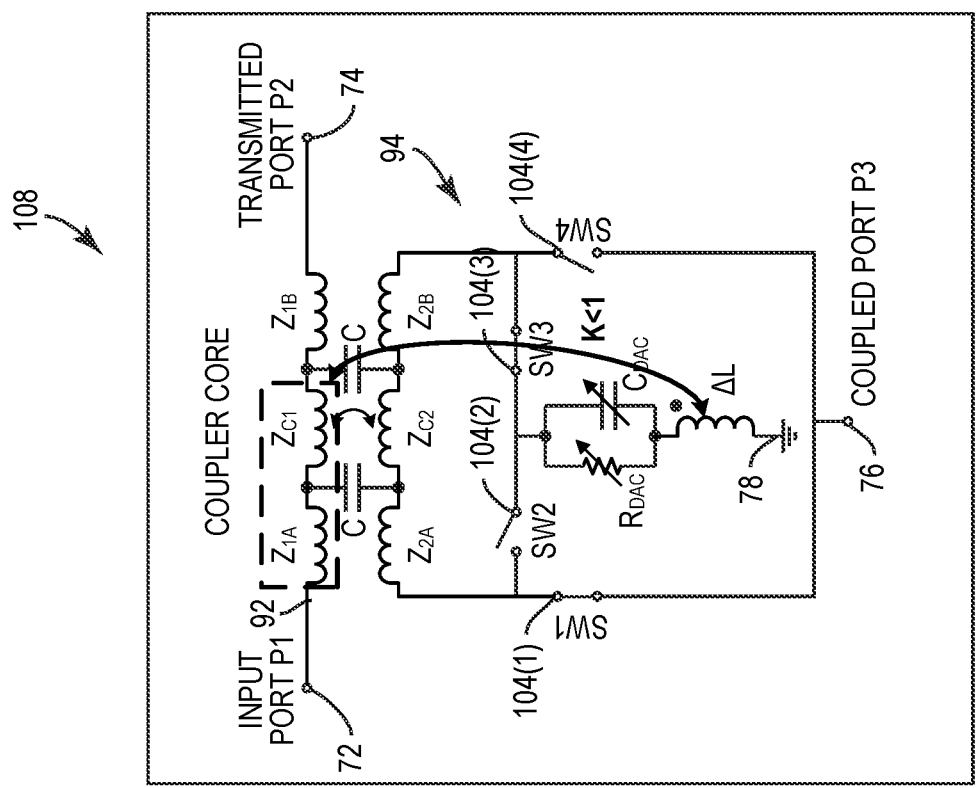
FIG. 9C is a schematic diagram of a dual directional coupler with increased in-phase ground mutual inductance ΔL according to another exemplary aspect of the present disclosure.

FIG. 9C is a schematic diagram of a dual directional coupler 108 with increased in-phase ground mutual inductance $\Delta L$ according to another exemplary aspect of the present disclosure. FIG. 9D is an isometric view of a layout of the dual directional coupler 108 of FIG. 9C with current paths shown.

The layouts of FIGS. 9B and 9D show the inductance $\Delta L$ (of the path connected to the fourth port 78 (e.g., RF ground bump)) mutually coupling with the first conductive path 92. The configuration is for the forward mode. The bold arrows represent the first conductive path 92 current I1 and induced current I2. Due to the Lenz's law, the direction of I2 is opposite to I1. The dot next to the inductor $\Delta L$ in FIGS. 9A and 9C indicates whether the additional coupling is in phase or anti-phase with the main coupling mechanism.

3. Increasing the Magnetic Coupling Between the Coupler Out Trace and the First Conductive Path The same concept can be used for the conductive path connecting the coupled bump (e.g., the third port 76), as show in FIGS. 10A-10D.

Figure 10B:
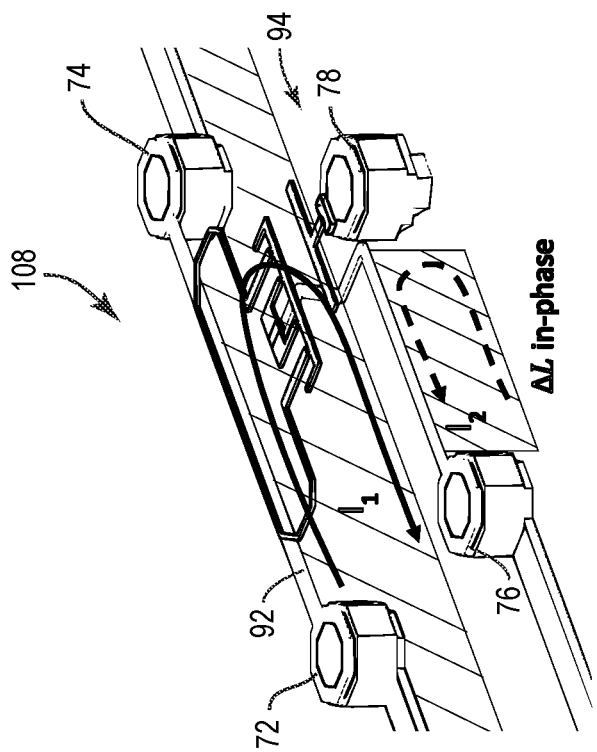
FIG. 10B is an isometric view of a layout of the dual directional coupler of FIG. 10A with current paths shown.
Figure 10A:
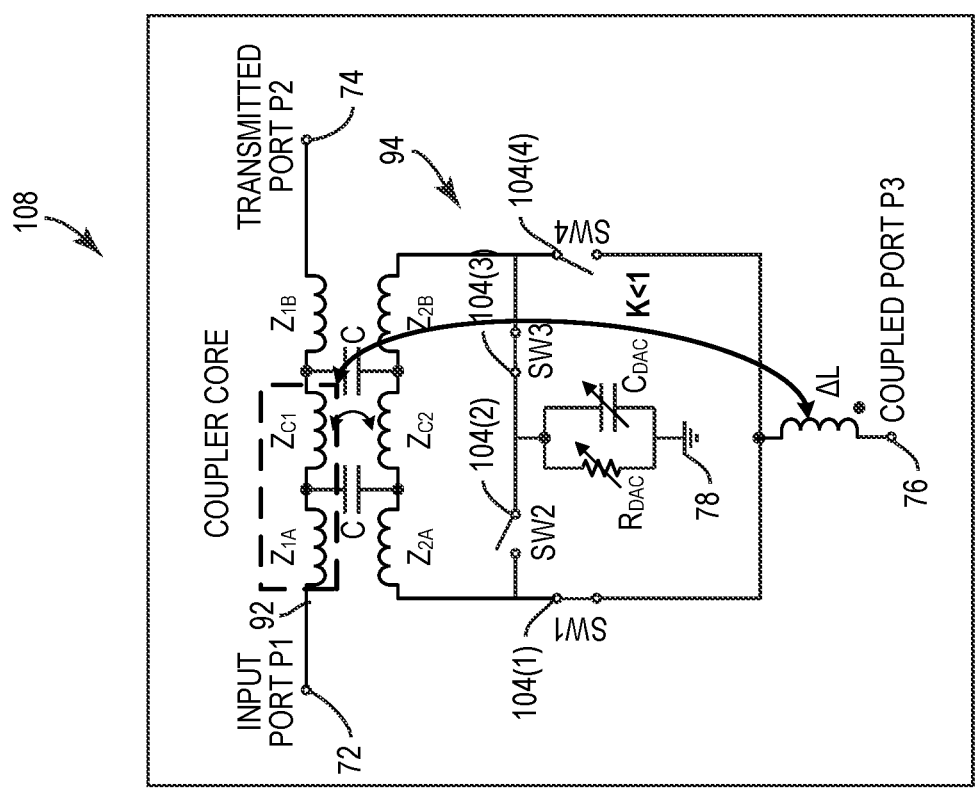
FIG. 10A is a schematic diagram of a dual directional coupler with increased in-phase coupled port mutual inductance ΔL according to another exemplary aspect of the present disclosure.

FIG. 10A is a schematic diagram of a dual directional coupler 108 with increased in-phase coupled port mutual inductance $\Delta L$ according to another exemplary aspect of the present disclosure. FIG. 10B is an isometric view of a layout of the dual directional coupler 108 of FIG. 10A with current paths shown.

FIG. 10C is a schematic diagram of a dual directional coupler 108 with increased anti-phase coupled port mutual inductance $\Delta L$ according to another exemplary aspect of the present disclosure. FIG. 10D is an isometric view of a layout of the dual directional coupler 108 of FIG. 10C with current paths shown.

C. Designing for Symmetrical RF Performance Through Compensating Couplings

Figure 11A:
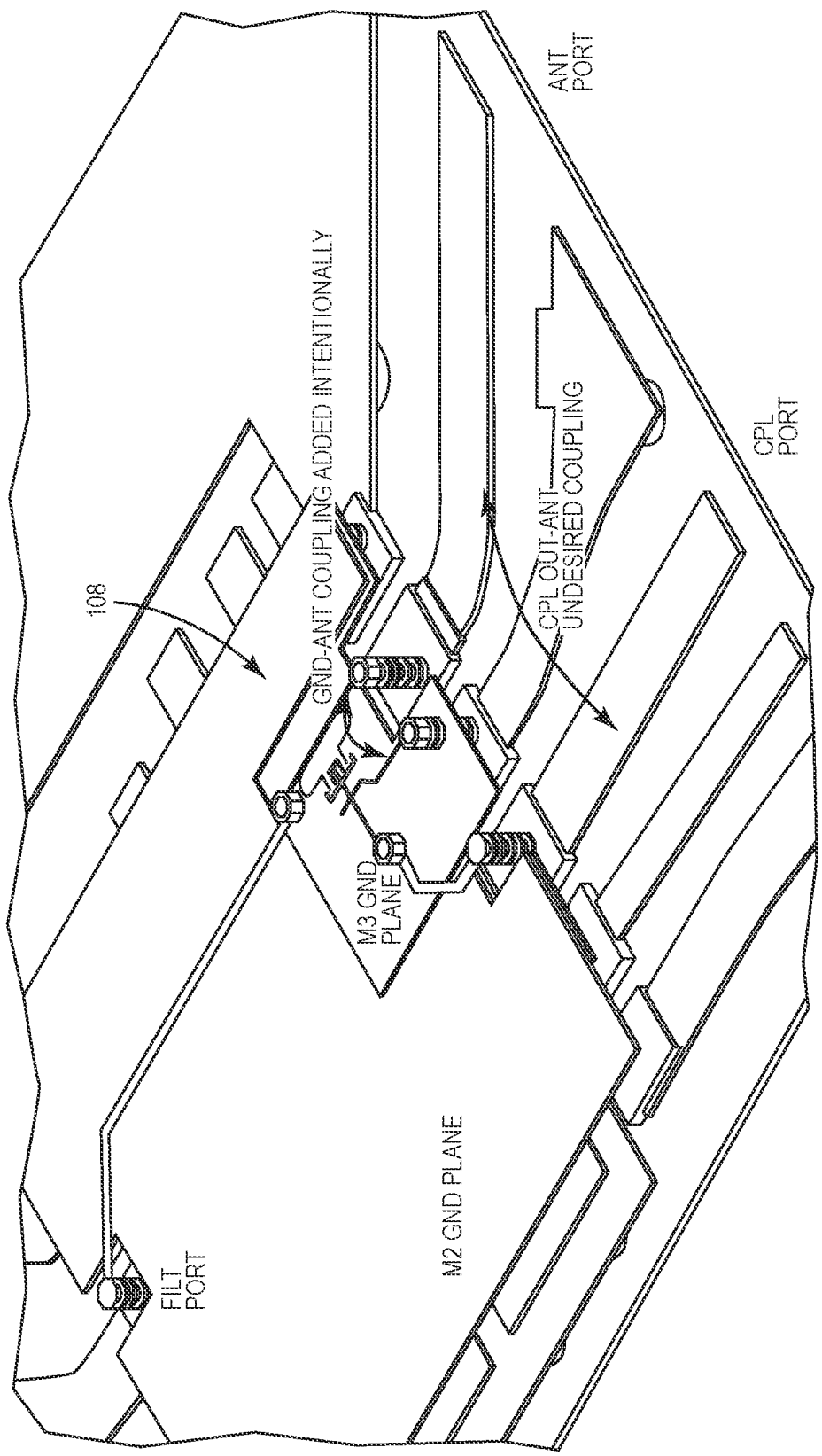
FIG. 11A is an isometric view of the dual directional coupler according to FIGS. 6C and 6D compensating for an asymmetric module routing.

FIG. 11A is an isometric view of the dual directional coupler 108 according to FIGS. 6C and 6D compensating for an asymmetric module routing. The die layout of the dual directional coupler 108 is intentionally asymmetric to guarantee symmetric performance between forward and reverse mode. Here, the additional coupling obtained due to the asymmetric die of the dual directional coupler 108 compensates the undesired coupling due to the EVB/laminate routing shown.

Figure 11C:
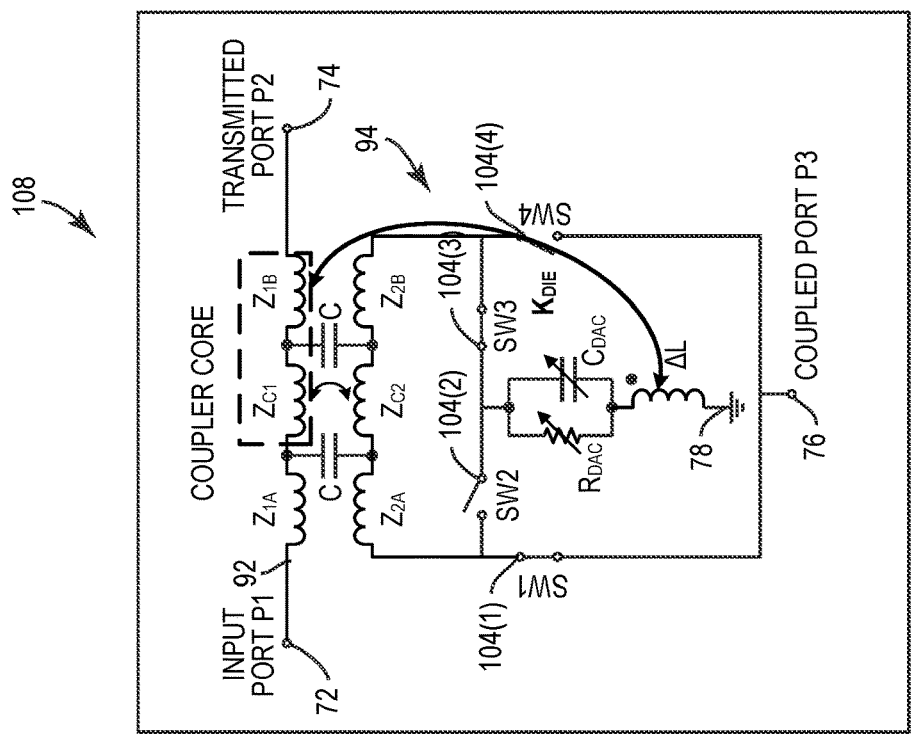
FIG. 11C is a schematic diagram of the dual directional coupler of FIG. 11A.
Figure 11B:
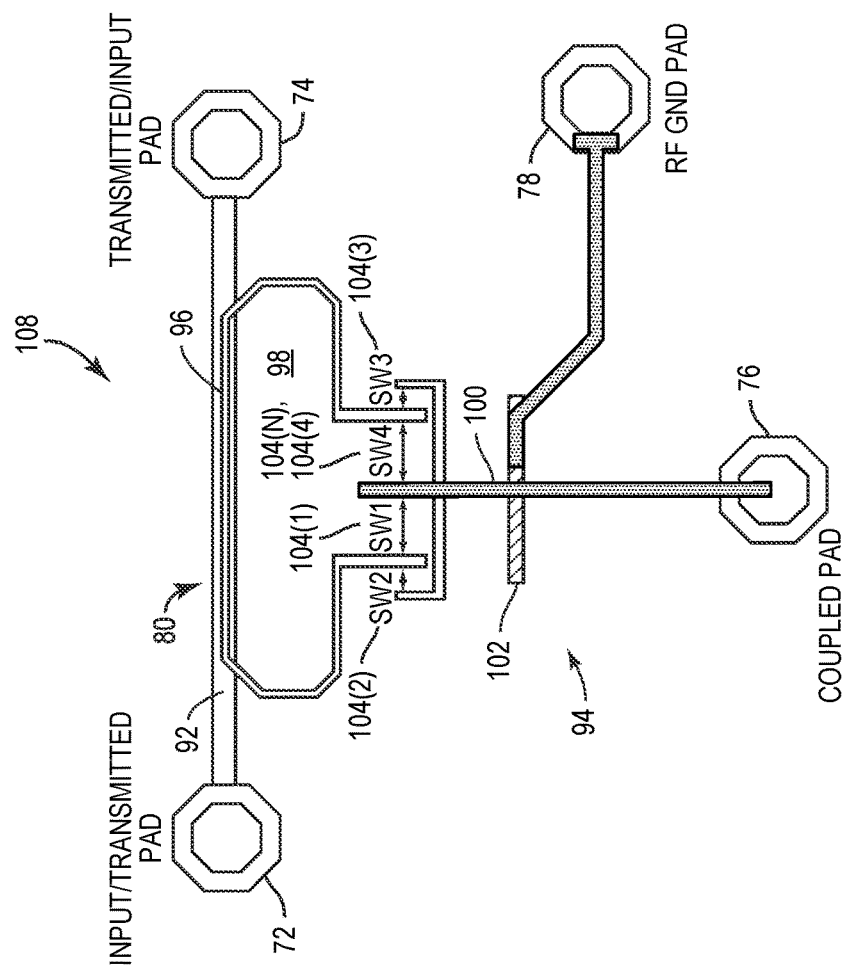
FIG. 11B is a top view of the layout of the dual directional coupler of FIG. 11A.

FIG. 11B is a top view of the layout of the dual directional coupler 108 of FIG. 11A. FIG. 11C is a schematic diagram of the dual directional coupler 108 of FIG. 11A. The asymmetric die of the dual directional coupler 108 has an additional mutual coupling KDIE which cancels out the undesired coupling occurring at laminate and EVB level. In some embodiments, the ground plane is locally moved from M2 to M3 (see FIG. 11A) to increase KDIE and avoid any die area increase.

D. Asymmetric Coupler Layout with Switchable Grounds

In some applications, the forward and reverse modes may need to be tuned independently from each other. In such embodiments, the topology of the dual directional coupler 108 may have dedicated ground bumps (or coupled bumps) for the forward and reverse mode, where each respective inductance $L_{FWD}$ and $L_{REV}$ may or may not couple to the first conductive path 92.

Figure 12B:
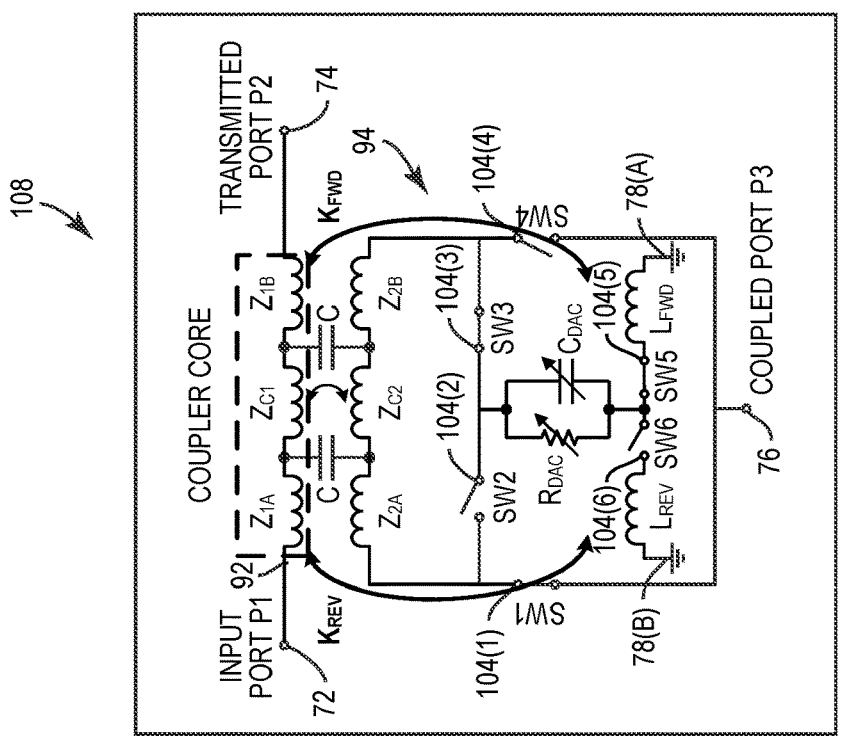
FIG. 12B is a schematic diagram of the switchable dual directional coupler of FIG. 12A.
Figure 12A:
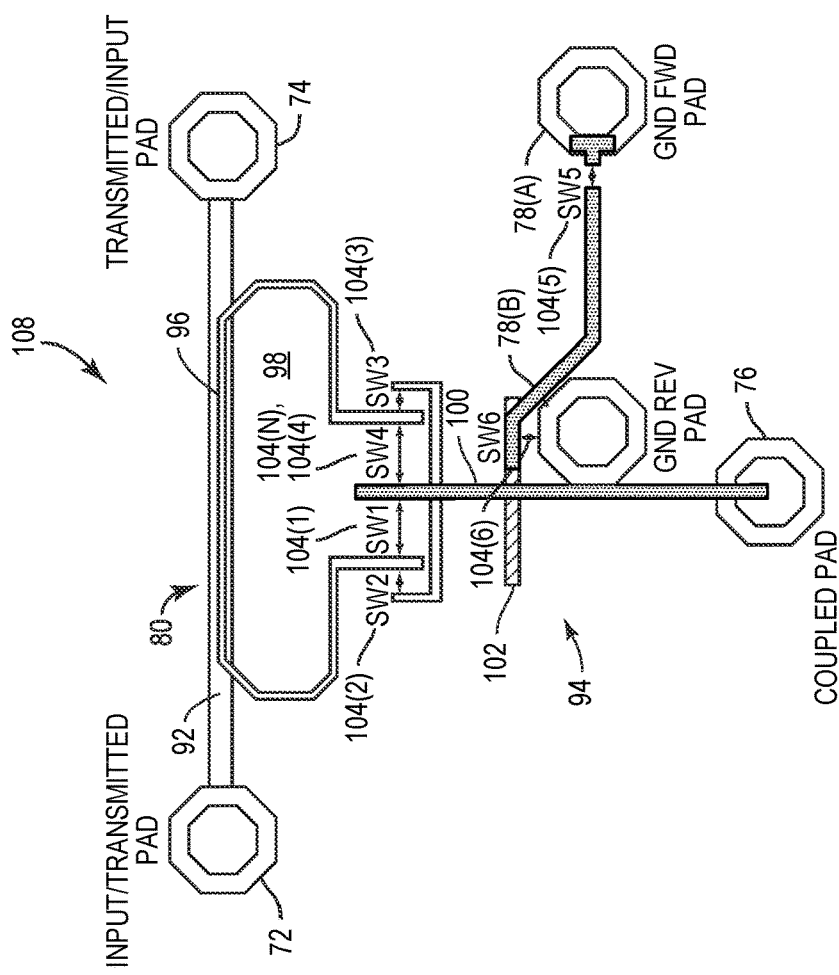
FIG. 12A is a top view of a switchable dual directional coupler according to another exemplary aspect of the present disclosure.

FIG. 12A is a top view of a switchable dual directional coupler 110 according to another exemplary aspect of the present disclosure. FIG. 12B is a schematic diagram of the switchable dual directional coupler 110 of FIG. 12A. In the exemplary embodiment of FIGS. 12A and 12B, $L_{REV}$ does not couple (or couples negligibly) to the first conductive path 92 and $L_{FWD}$ couples to the first conductive path 92.

Therefore, it can be assumed $K_{REV} \Rightarrow 0$ while $K_{FWD} \gg 0$, resulting in different tuning in the forward and reverse directions.

In this regard, an additional switch 104(5) connects the second portion 100 of the second conductive path 94 to the ground forward pad 78(A) and is closed in the forward mode and open in the reverse mode. Similarly, another switch 104(6) connects the second portion 100 of the second conductive path 94 to the ground reverse pad 78(B) and is closed in the reverse mode and open in the forward mode. The topology of the switchable dual directional coupler 110 may serve in complex circuit configurations as antenna switches.

III. Wireless Communication Device

As alluded to earlier, dual directional couplers such as those described herein may be found in myriad computing devices such as a mobile terminal. An exemplary mobile terminal 200 that may include one of the dual directional couplers described herein is provided with reference to FIG. 13. In this regard, FIG. 13 is a system-level block diagram of an exemplary mobile terminal 200 such as a smart phone, mobile computing device tablet, or the like.

Figure 13:
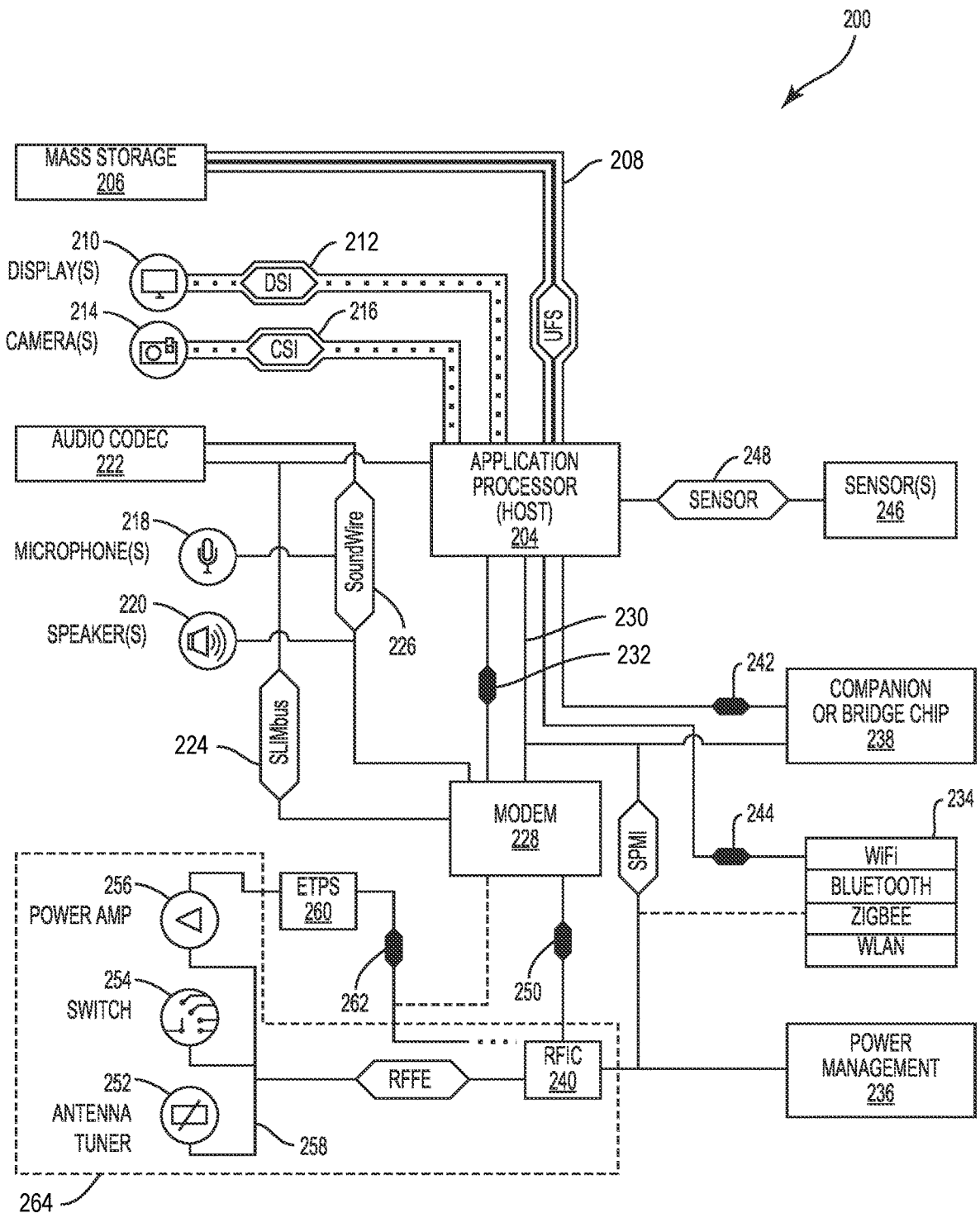
FIG. 13 illustrates a wireless communication device that may include a dual directional coupler of the present disclosure in, for example, a radio frequency (RF) front end component.

With continued reference to FIG. 13, the mobile terminal 200 includes an application processor 204 (sometimes referred to as a host) that communicates with a mass storage element 206 through a universal flash storage (UFS) bus 208. The application processor 204 may further be connected to a display 210 through a display serial interface (DSI) bus 212 and a camera 214 through a camera serial interface (CSI) bus 216. Various audio elements such as a microphone 218, a speaker 220, and an audio codec 222 may be coupled to the application processor 204 through a serial low-power interchip multimedia bus (SLIMbus) 224. Additionally, the audio elements may communicate with each other through a SOUNDWIRE bus 226. A modem 228 may also be coupled to the SLIMbus 224 and/or the SOUND-WIRE bus 226. The modem 228 may further be connected to the application processor 204 through a peripheral component interconnect (PCI) or PCI express (PCIe) bus 230 and/or a system power management interface (SPMI) bus 232.

With continued reference to FIG. 13, the SPMI bus 232 may also be coupled to a local area network (LAN or WLAN) IC (LAN IC or WLAN IC) 234, a power management integrated circuit (PMIC) 236, a companion IC (sometimes referred to as a bridge chip) 238, and a radio frequency IC (RFIC) 240. It should be appreciated that separate PCI buses 242 and 244 may also couple the application processor 204 to the companion IC 238 and the WLAN IC 234. The application processor 204 may further be connected to sensors 246 through a sensor bus 248. The modem 228 and the RFIC 240 may communicate using a bus 250.

With continued reference to FIG. 13, the RFIC 240 may couple to one or more RFFE elements, such as an antenna tuner 252, a switch 254, and a power amplifier 256 through a radio frequency front end (RFFE) bus 258. Additionally, the RFIC 240 may couple to an envelope tracking power supply (ETPS) 260 through a bus 262, and the ETPS 260 may communicate with the power amplifier 256. Collectively, the RFFE elements, including the RFIC 240, may be considered an RFFE system 264. It should be appreciated that the RFFE bus 258 may be formed from a clock line and a data line (not illustrated). While dual directional couplers may be provided in any number of elements within a mobile terminal, it should be appreciated that elements such as the switch 254 may rely heavily on a dual directional coupler.

Those skilled in the art will recognize improvements and modifications to the preferred embodiments of the present disclosure. All such improvements and modifications are considered within the scope of the concepts disclosed herein and the claims that follow.

What is claimed is:

1. A dual directional coupler having multiple couplings, comprising:
    a first port;
    a second port;
    a first conductive path coupling the first port to the second port, wherein the first conductive path is symmetrical between the first port and the second port across an axis of symmetry;
    a third port coupled to ground;
    a fourth port asymmetrically positioned relative to the axis of symmetry, wherein one of the third port and the fourth port is positioned on the axis of symmetry; and
    a second conductive path coupling the third port to the fourth port, the second conductive path electromagnetically coupled to the first conductive path, the second conductive path comprising one or more switches, wherein the third port is positioned on the axis of symmetry and a conductive path between the second conductive path and the fourth port electromagnetically couples to the first conductive path;
    wherein the fourth port is asymmetrically positioned relative to the axis of symmetry such that a portion of the second conductive path couples to the first conductive path to compensate for asymmetries between a forward mode and a reverse mode of the dual directional coupler.

2. The dual directional coupler of claim 1, wherein the fourth port is asymmetrically positioned relative to the third port to produce an in-phase inductance connected to the second conductive path.

3. The dual directional coupler of claim 1, wherein the fourth port is asymmetrically positioned relative to the third port to produce an anti-phase inductance connected to the second conductive path.

4. The dual directional coupler of claim 1, further comprising a fifth port coupled to ground and switchably coupled to the second conductive path.

5. The dual directional coupler of claim 4, wherein the third port is switchably coupled to the second conductive path such that in one of the forward mode or the reverse mode the third port is connected to the second conductive path and the fifth port is disconnected from the second conductive path.

6. The dual directional coupler of claim 4, wherein the fourth port is switchably coupled to the second conductive path such that in one of the forward mode or the reverse mode the fourth port is connected to the second conductive path and the fifth port is disconnected from the second conductive path.

7. The dual directional coupler of claim 1, further comprising a dielectric material positioned between the first conductive path and the second conductive path.

8. The dual directional coupler of claim 7, wherein the first conductive path lies in a first plane and the second conductive path lies in a second plane different than the first plane.

9. The dual directional coupler of claim 8, wherein the second conductive path is positioned at least partially over the first conductive path.

10. The dual directional coupler of claim 1, wherein the third port is asymmetrically positioned relative to the axis of symmetry such that the portion of the second conductive path couples to the first conductive path to compensate for asymmetries between the forward mode and the reverse mode of the dual directional coupler.

11. A radio frequency (RF) front end module comprising:
a filter;
a power amplifier coupled to the filter; and
a dual directional coupler comprising:
a first port coupled to the filter;
a second port;
a first conductive path coupling the first port to the second port, the first conductive path being symmetrical between the first port and the second port across an axis of symmetry;
a third port coupled to ground;
a fourth port, wherein the third port and the fourth port are positioned on the axis of symmetry; and
a second conductive path coupling the third port to the fourth port, the second conductive path electromagnetically coupled to the first conductive path, the second conductive path comprising one or more switches, the second conductive path being asymmetrical across the axis of symmetry to compensate for asymmetries between a forward mode and a reverse mode of the dual directional coupler, wherein the second conductive path being asymmetrical produces a mutual inductance with the first conductive path in the third port or the fourth port, which compensates for the asymmetries between the forward mode and the reverse mode.

12. The RF front-end module of claim 11, wherein one of the third port and the fourth port are positioned on the axis of symmetry.

13. The RF front-end module of claim 12, wherein the fourth port is positioned on the axis of symmetry and a portion of the second conductive path connected to the third port electromagnetically couples to the first conductive path.

14. The RF front-end module of claim 12, wherein the third port is positioned on the axis of symmetry and a portion of the second conductive path connected to the fourth port electromagnetically couples to the first conductive path.

15. The RF front-end module of claim 11, further comprising a fifth port coupled to ground and switchably coupled to the second conductive path.

* * * * *